(12) United States Patent
Cheng et al.

(10) Patent No.: US 11,966,245 B2
(45) Date of Patent: Apr. 23, 2024

(54) VOLTAGE REFERENCE SOURCE CIRCUIT AND LOW POWER CONSUMPTION POWER SUPPLY SYSTEM

(71) Applicant: FocalTech Electronics (Shenzhen) Co., Ltd., Shenzhen (CN)

(72) Inventors: Zhen-Juan Cheng, Guangdong (CN); Jing-Kai Zhang, Guangdong (CN); Jin-Cheng Tian, Guangdong (CN); Xin-Xi Jiang, Guangdong (CN)

(73) Assignee: FocalTech Electronics (Shenzhen) Co., Ltd., Shenzhen (CN)

( * ) Notice: Subject to any disclaimer, the term of this patent is extended or adjusted under 35 U.S.C. 154(b) by 348 days.

(21) Appl. No.: 17/389,580

(22) Filed: Jul. 30, 2021

(65) Prior Publication Data
US 2021/0356982 A1 Nov. 18, 2021

Related U.S. Application Data

(63) Continuation-in-part of application No. PCT/CN2020/077287, filed on Feb. 28, 2020.

(30) Foreign Application Priority Data

Jan. 31, 2019 (CN) .......................... 201910100081.5

(51) Int. Cl.
*G05F 3/26* (2006.01)
*G05F 1/46* (2006.01)
*G05F 1/567* (2006.01)

(52) U.S. Cl.
CPC .............. *G05F 3/262* (2013.01); *G05F 1/468* (2013.01); *G05F 1/567* (2013.01)

(58) Field of Classification Search
CPC .......... G05F 1/468; G05F 1/567; G05F 3/262; G06F 1/32; H02M 1/42
See application file for complete search history.

(56) References Cited

U.S. PATENT DOCUMENTS

| 7,573,324 B2 | 8/2009 | Kuwano |
| 2010/0052636 A1 | 3/2010 | Takagi et al. |

FOREIGN PATENT DOCUMENTS

| CN | 102183991 A | 9/2011 |
| CN | 102289243 A | 12/2011 |

(Continued)

*Primary Examiner* — Scott Bauer
*Assistant Examiner* — Johana Dumeng-Roman
(74) *Attorney, Agent, or Firm* — ScienBiziP, P.C.

(57) ABSTRACT

The present disclosure provides a voltage reference source circuit for generating a reference voltage, the voltage reference source circuit comprises a starting circuit, a current generating circuit, and an output voltage reference circuit electrically connected in sequence. The starting circuit provides a starting voltage for the voltage reference source circuit to prevent the voltage reference source circuit from operating in zero state area. The current generating circuit generates a working current for the output voltage reference circuit; and the output voltage reference circuit is used to realize the reference voltage output with zero temperature coefficient according to the working current output by the current generating circuit. A low power consumption power supply system is also disclosed. The voltage reference source circuit and the low power consumption power supply system with the voltage reference source circuit have simple circuit structure, strong anti-noise ability, high stability and high performance.

11 Claims, 6 Drawing Sheets

(56) References Cited

FOREIGN PATENT DOCUMENTS

| | | | | |
|---|---|---|---|---|
| CN | 105676938 A | * | 6/2016 | ............. G05F 1/567 |
| CN | 105955390 A | | 9/2016 | |
| CN | 106647911 A | | 5/2017 | |
| CN | 107562111 A | | 1/2018 | |
| CN | 108241398 A | | 7/2018 | |
| CN | 108958347 A | | 12/2018 | |
| CN | 109947165 A | | 6/2019 | |
| TW | 200719112 A | | 5/2007 | |

* cited by examiner $VREF = V_{BE} + N*VT$

VOLTAGE REFERENCE SOURCE CIRCUIT AND LOW POWER CONSUMPTION POWER SUPPLY SYSTEM

TECHNICAL FIELD

The present disclosure relates to power supplies, in particular to a voltage reference source circuit and a low power consumption power supply system.

BACKGROUND

In consumer electronic products, the battery is often the power supply source of the circuit. In order to increase the battery life, one aspect is to reduce the power consumption of the circuit system in some modes and generally prolong the service life of the battery.

The power supply system mainly includes a voltage reference circuit and a voltage regulator circuit. In low-power mode applications, in order to reduce power consumption, one of the commonly used solutions is to reduce the power consumption of the voltage reference circuit, when the voltage regulator circuit needs to be turned on frequently. Although the power consumption is reduced, circuit performance anti-noise features may be lost at the same time. When working in a non-low-power mode, the performance of the power system cannot meet the design requirements.

The present disclosure is related to an ultra-low power consumption power system scheme. In the low power consumption mode, the power consumption of the power system is very low. In the normal working mode, the power system enters the normal working mode through system control to provide the entire system with high stability, high noise immunity, and high energy power supply.

Band gap is a commonly used reference voltage source in power supply systems, as shown in FIG. 1. Band gap uses the negative temperature coefficient of VBE and the positive temperature coefficient of ΔVBE=k*VT, and after temperature compensation, zero temperature coefficient can be obtained, and the reference voltage VREF will be near the band gap. In order to meet the requirements of low power consumption, the current of bandgap core must be reduced. However, some documents have pointed out that when the current of bandgap core decreases, the anti-noise abilities of Bandgap circuit is very poor, and substrate noise or power supply noise may cause voltage oscillation. Therefore, in a high-noise system, the Bandgap power consumption of the bandgap structure with low power consumption does not reach the order of tens of nA.

FIG. 2 shows a circuit diagram of an existing low-power voltage reference source circuit. MOS tube PM3 and MOS tube PM4 form a current mirror. The current generated by the current generating unit is mirrored to the voltage output load unit through the current mirror. The branch where the MOS tube PM3 is located obtains a current βI proportional to I. The ratio is determined by the length of the MOS tube PM3 and the MOS tube PM4, so the expression for the reference voltage Vref is:

$$V_{ref} = V_{TH6}(T_0) - \kappa_t(T-T_0) + \eta V_T \left( \ln \frac{K_5}{\beta K_7} + \frac{\sqrt{K_3 K_4}}{\sqrt{K_3}-\sqrt{K_4}} \sqrt{\frac{1+\beta}{K_6}} \ln \frac{K_2}{K_1} \right) \quad (1)$$

Among them, MOS tube M1', MOS tube M2', MOS tube M5', and MOS tube M7' all need to work in the sub-threshold region, and MOS tube M3', MOS tube M4', and MOS tube M6' all need to work in the saturation region. Therefore, the working state of each tube needs to be considered during design. In low-power applications, the devices that work in the saturation region are all inverted tubes with a relatively large size, occupying more layout area. In addition, in order to reduce the power consumption in low-power mode applications, the usual practice is to reduce the power consumption of the module that needs to be turned on in the low-power mode. However, reduction of power consumption also loses other properties of the circuit, such as anti-noise ability and transient response ability of the circuit. Herein, the power supply index of the system during normal operation does not meet system requirements for high performance.

SUMMARY OF THE DISCLOSURE

In view of the foregoing, it is necessary to provide a voltage reference source circuit with high noise immunity and zero temperature coefficient voltage output, and a low power consumption power supply system with the voltage reference source circuit.

One aspect of the present disclosure provides a voltage reference source circuit for generating a reference voltage, the voltage reference source circuit includes a starting circuit, a current generating circuit, and an output voltage reference circuit electrically connected in sequence;

The starting circuit provides a starting voltage for the voltage reference source circuit to prevent the voltage reference source circuit from operating in a zero state area;

The current generating circuit generates a working current for the output voltage reference circuit; and The output voltage reference circuit realizes the reference voltage output with zero temperature coefficient according to the working current output by the current generating circuit.

As a preferred solution, the starting circuit includes a first PMOS tube, a first NMOS tube, and a second NMOS tube. Source terminal of the first PMOS tube is connected to a first power source, and a gate of the first PMOS tube is grounded, a drain of the first PMOS tube is connected to the gate of the first NMOS tube, and a drain and a source of the first NMOS tube lead out a first start signal output terminal and a second start signal output terminal respectively, to provide a start signal to the current generating circuit. Drain terminal of the second NMOS tube is connected to the gate of the first NMOS tube, a source of the second NMOS tube is grounded, and the source of the second NMOS tube is also connected to the source of the first NMOS tube. Gate terminal of the second NMOS tube is connected to a reference voltage output terminal.

As a preferred solution, the current generating circuit includes a third NMOS tube, a second PMOS tube, a third PMOS tube, a fourth NMOS tube, and a fifth NMOS tube; a source of the third NMOS tube is connected to the source of the second NMOS tube, a gate of the third NMOS tube is connected to a drain of the third NMOS tube, and the drain of the third NMOS tube is also connected to a drain of the second PMOS tube, a source of the second PMOS tube is connected to the first power source, a gate of the second PMOS tube is connected to the drain of the first NMOS tube, and a gate of the second PMOS tube is also connected to a gate of the third PMOS tube, a source of the third PMOS tube is connected to the first power source, a drain of the third PMOS tube is connected to a drain of the fourth NMOS tube, and a gate of the fourth NMOS tube is connected to the gate of the third NMOS tube, a source of the fourth NMOS tube is connected to a drain of the fifth NMOS tube, a source of the fifth NMOS tube is grounded, and a gate of the fifth NMOS tube is connected to the reference voltage output terminal.

As a preferred solution, the output voltage reference circuit includes a fourth PMOS tube, a fifth PMOS tube, a sixth NMOS tube, a seventh NMOS tube, and an eighth NMOS tube, a source of the fourth PMOS tube is connected to the first power source, a gate of the fourth PMOS tube is connected to the drain of the third PMOS tube, a drain of the fourth PMOS tube is connected to a drain of the fifth PMOS tube, and a gate of the fifth PMOS tube is connected to a drain of the fifth PMOS tube, a gate of the fifth PMOS tube is also connected to a gate of the sixth NMOS tube, and a source of the fifth PMOS tube is connected to a drain of the sixth NMOS tube, a source of the sixth NMOS tube is connected to a source of the fifth NMOS tube, a gate of the seventh NMOS tube is connected to a gate of the fourth PMOS tube, and a source of the seventh NMOS tube is connected to the first power supply, a drain of the seventh NMOS tube is connected to a drain and a gate of the eighth NMOS tube, a source of the eighth NMOS tube is connected to the drain of the sixth NMOS tube, and a drain of the eighth NMOS tube serves as the reference voltage output terminal.

Another aspect of the present disclosure provides a low power consumption power supply system, the low power consumption power supply system includes a voltage regulator circuit and any one of the above-mentioned voltage reference source circuits, the voltage regulator circuit is electrically connected to the voltage reference source circuit, the voltage regulator circuit is used to receive a reference voltage, and amplifies the reference voltage in a preset ratio and outputs a power supply.

As a preferred solution, the voltage regulator circuit includes a first branch, a second branch, and a third branch electrically connected in sequence, and the first branch comprises a sixth PMOS tube, a seventh PMOS tube, an eighth PMOS tube, a ninth NMOS tube and a tenth NMOS tube, a gate of the sixth PMOS tube is connected to the drain of the third PMOS tube, and a source of the sixth PMOS tube is connected to a second power source, a drain of the sixth PMOS tube is connected to a source of the seventh PMOS tube and a source of the eighth PMOS tube, a gate of the seventh PMOS tube is connected to the reference voltage output terminal to receive the reference voltage, a drain of the seventh PMOS tube is connected to a drain of the ninth NMOS tube, a gate of the ninth NMOS tube is connected to a gate of the tenth NMOS tube, a source of the ninth NMOS tube is grounded, and a ninth NMOS tube is grounded, a source of the tube is also connected to a source of the tenth NMOS, a drain of the eighth PMOS tube is connected to a drain of the tenth NMOS tube, and the drain of the eighth PMOS tube is also connected to the second branch, a gate of the eight PMOS tube is connected to the third branch.

As a preferred solution, the second branch includes a ninth PMOS tube and an eleventh NMOS tube, and a gate of the ninth PMOS tube is connected to a drain of the ninth PMOS tube, a source of the ninth PMOS tube is connected to the second power source, a drain of the ninth PMOS tube is connected to a drain of the eleventh NMOS tube, and a gate of the eleventh NMOS tube is connected to the drain of the eighth PMOS tube, a drain of the eleventh NMOS tube is grounded.

As a preferred solution, the third branch includes a tenth PMOS tube, an adjustable resistor, a resistor, and a capacitor. Gate terminal of the tenth PMOS tube is connected to the drain of the ninth PMOS tube, a source of the tenth PMOS tuber is connected to the second power source, a drain of the tenth PMOS tube is connected to a first terminal of the adjustable resistor, and a second terminal of the adjustable resistor is grounded through the resistor, a first node between the second terminal of the adjustable resistor and the resistor is connected to the gate of the ninth NMOS tube, and a second node between the drain of the tenth PMOS tube and the first terminal of the adjustable resistor is used as the power supply voltage output terminal.

As a preferred solution, the third branch further comprises a capacitor, a first terminal of the capacitor is connected to the power supply voltage output terminal, and a second terminal of the capacitor is grounded.

As a preferred solution, the voltage regulator circuit includes a sixth PMOS tube, a seventh PMOS tube, an eighth PMOS tube, a ninth NMOS tube, a tenth NMOS tube, a resistor, and adjustable resistor, a source of the sixth PMOS tube is connected to the second power source, a gate of the sixth PMOS tube is connected to a drain of the sixth PMOS tube, and a gate of the sixth PMOS tube is also connected to a seventh PMOS tube, a source of the seventh PMOS tube is connected to the second power source, a drain of the seventh PMOS tube is connected to a gate of the eighth PMOS tube, and a source of the eighth PMOS tube is connected to the second power source, a drain of the eighth PMOS tube is grounded through the adjustable resistor and the resistor in turn, a drain of the seventh PMOS tube is connected to a drain of the tenth NMOS tube, and a gate of the tenth NMOS tube is connected to the reference voltage output terminal, a source of the tenth NMOS tube and the source of the ninth NMOS tube are both grounded through a current source, the drain of the ninth NMOS tube is connected to the drain of the sixth PMOS tube, and the gate of the ninth NMOS tube is connected to the node between the adjustable resistor and the resistor, and the node between the drain of the eighth PMOS tube and the adjustable resistor is used as the power supply output terminal.

The voltage reference source circuit of the present disclosure and the low power consumption power system having the voltage reference source circuit generate a reference voltage with zero temperature coefficient through the voltage reference source circuit, and present the reference voltage in a preset ratio through the voltage regulator circuit output power supply after amplification. In this way, the low power consumption power supply system provided by the present disclosure has a simple circuit structure, strong anti-noise ability, high stability, and high performance.

REFERENCE SIGNS OF MAIN COMPONENTS

Figure 1:
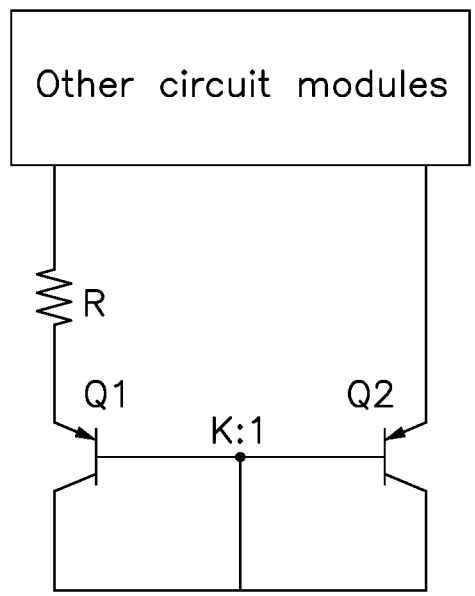
FIG. 1 is a circuit diagram of a band gap structure of a conventional reference voltage source.
Figure 2:
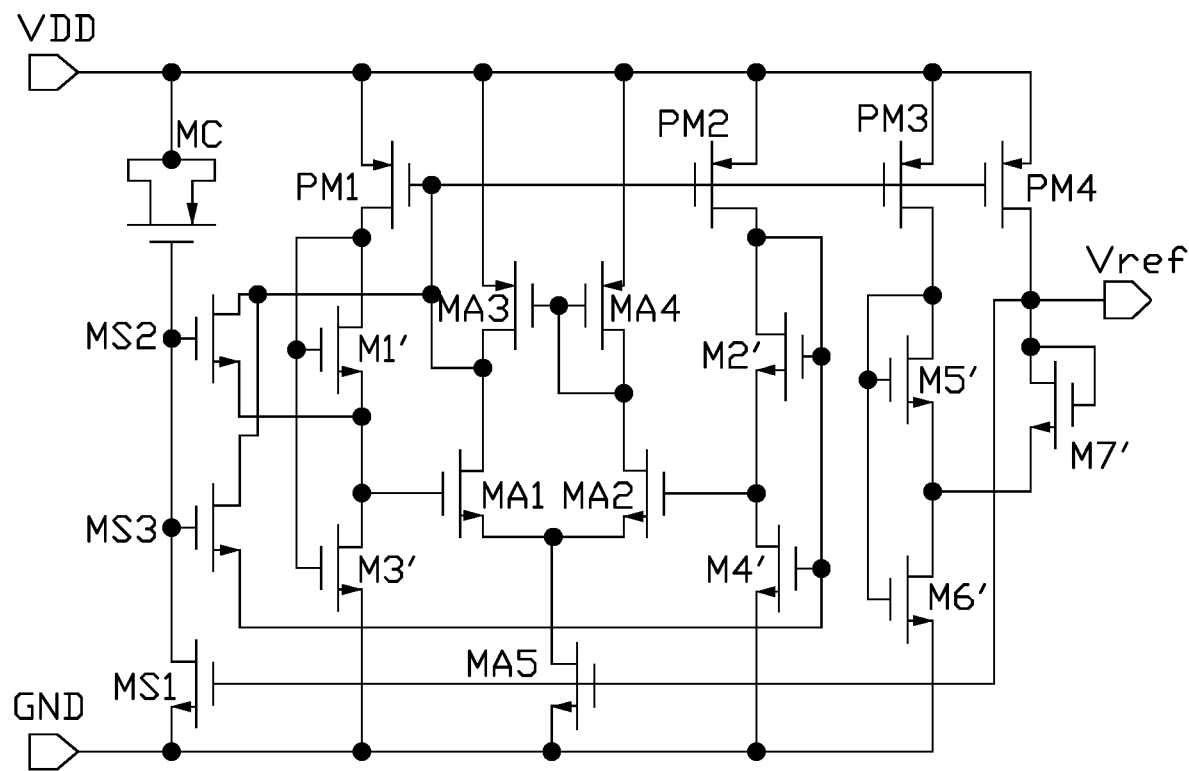
FIG. 2 is a circuit diagram of a conventional voltage reference source circuit.

Voltage reference source circuit 100
Voltage regulator circuit 200
Low power consumption power supply system 300
Normal mode power supply system 400
Starting circuit 10
Current generating circuit 20
Output voltage reference circuit 30
First branch 40
Second branch 50
Third branch 60
MOS tubes M1-M29
Resistor R1, R3
Adjustable resistors R2, R4
Capacitors C1, C2

The following specific embodiments will further illustrate the present disclosure in conjunction with the above-mentioned drawings.

DETAILED DESCRIPTION

The technical solutions in the embodiments of the present disclosure will be described clearly and completely in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

Figure 3:
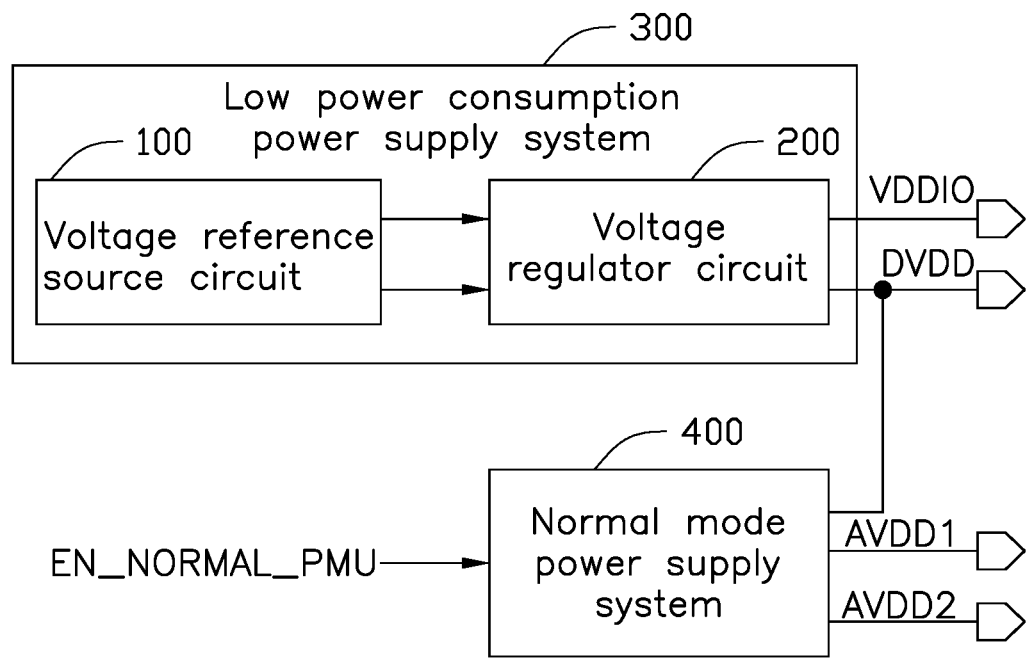
FIG. 3 is a block diagram of a low power consumption power supply system according to a preferred embodiment of the present disclosure.

Please refer to FIG. 3, FIG. 3 is a block diagram of the low power consumption power supply system 300 of the present disclosure. The low power consumption power supply system 300 includes a voltage reference source circuit 100 and a voltage regulator circuit 200. The voltage reference source circuit 100 is electrically connected to the voltage regulator circuit 200. The voltage reference source circuit 100 is used to generate a reference voltage, and the voltage regulator circuit is used to receive the reference voltage, and amplify the reference voltage by a preset ratio, and output the power supply.

In this embodiment, as shown in FIG. 3, in the normal working mode, the processing system (not shown) will directly switch on the enable signal of the normal working mode to trigger the normal mode power supply system 400 to start working, and the performance of the normal mode power supply system 400 does meet the system requirements. The low power consumption power system 300 does not affect the working performance of the normal mode power supply system 400 in the normal working mode. In the low power mode, the power consumption of the power system is very low. In the normal working mode, the normal mode power supply is entered through system control, thereby providing the entire system with high stability, high noise immunity, and high performance power supply. In this way, the low power consumption requirements of the low power consumption mode can be met without reducing the working performance in the normal working mode.

Figure 4:
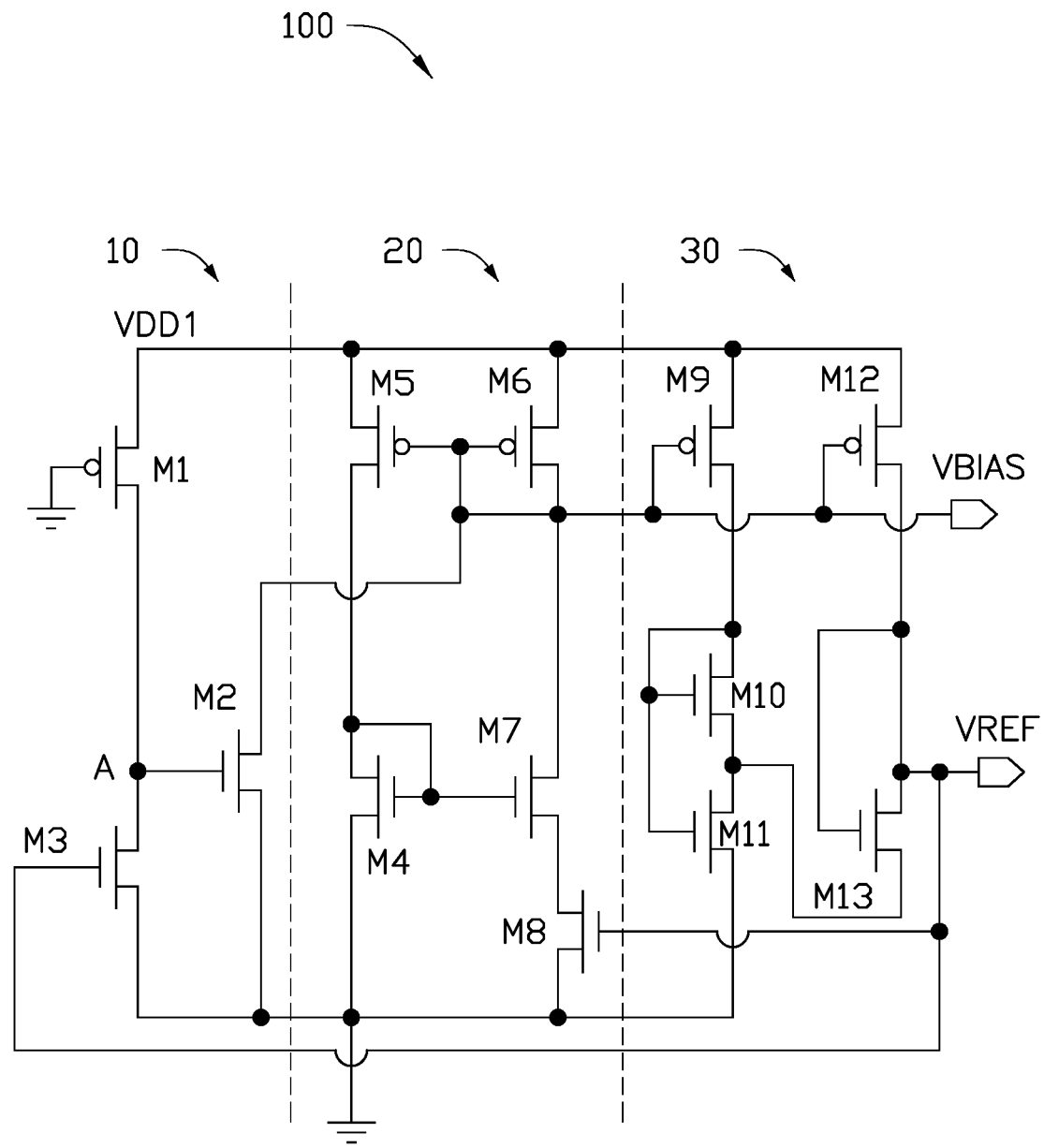
FIG. 4 is a circuit diagram of the voltage reference source circuit in FIG. 3.

Please refer to FIG. 4. FIG. 4 is a circuit diagram of a preferred embodiment of the voltage reference source circuit 100. In this embodiment, the voltage reference source circuit 100 includes a starting circuit 10, a current generating circuit 20, and an output voltage reference circuit 30 electrically connected in sequence.

The starting circuit 10 is used to provide starting voltage and current for the voltage reference source circuit 100, to prevent the voltage reference source circuit 100 from operating in the zero state area. The current generating circuit 20 is used to generate a working current for the output voltage reference circuit 30. The output voltage reference circuit 30 realizes a reference voltage output with zero temperature coefficient according to the working current output by the current generating circuit 20.

In this embodiment, the starting circuit 10 includes a PMOS tube M1, an NMOS tube M2, and an NMOS tube M3. A source of the PMOS tube M1 is connected to a power supply VDD1, a gate of the PMOS tube M1 is grounded, and a gate of the NMOS tube M2 is connected to a node A between a drain of the PMOS tube M1 and a drain of the NMOS tube M3, a drain and a source of the NMOS tube M2 respectively lead out to a first start signal output terminal and a second start signal output terminal, to provide a start signal to the current generating circuit 20. The drain terminal of the NMOS tube M2 is connected to the gate of the NMOS tube M2, a source of the NMOS tube M3 is grounded, the source of the NMOS tube M3 is also connected to the source of the NMOS tube M2, and the gate of the NMOS tube M3 is connected to the reference voltage output terminal VREF.

The current generating circuit 20 includes an NMOS tube M4, a PMOS tube M5, a PMOS tube M6, an NMOS tube M7, and an NMOS tube M8. A source of the NMOS tube M4 is connected to the source of the NMOS tube M3, a gate of the NMOS tube M4 is connected to the drain of the NMOS tube M4, and a drain of the NMOS tube M4 is also connected to a drain of the PMOS tube M5. A source of the PMOS tube M5 is connected to the power supply VDD1, a gate of the PMOS tube M5 is connected to the drain of the NMOS tube M2, the gate of the PMOS tube M5 is also connected to a gate of the PMOS tube M6, and a source of the PMOS tube M6 is connected to the power supply VDD1, a drain of the PMOS tube M6 is connected to the gate of the PMOS tube M6, the gate of the PMOS tube M6 is also connected to a drain of the NMOS tube M7, and a gate of the NMOS tube M7 is connected to a gate of the NMOS tube M4. The source of the NMOS tube M7 is connected to a drain of the NMOS tube M8, a source of the NMOS tube M8 is grounded, and a gate of the NMOS tube M8 is connected to the reference voltage output terminal VREF.

The output voltage reference circuit 30 includes a PMOS tube M9, a PMOS tube M10, an NMOS tube M11, an NMOS tube M12, and an NMOS tube M13. A source of the PMOS tube M9 is connected to the power supply VDD1, a gate of the PMOS tube M9 is connected to the drain of the PMOS tube M6, a drain of the PMOS tube M9 is connected to a drain of the PMOS tube M10, and a gate of the PMOS tube M10 is connected to the drain of the PMOS tube M10. The gate of the PMOS tube M10 is also connected to a gate of the NMOS tube M11, a source of the PMOS tube M10 is connected to a drain of the NMOS tube M11, and a source of the NMOS tube M11 is connected to the source of the NMOS tube M8, a gate of the NMOS tube M12 is connected to the gate of the PMOS tube M9, a source of the NMOS tube M12 is connected to the power supply VDD1, and a drain of the NMOS tube M12 is connected to a gate of the NMOS tube M13 and a drain of the NMOS tube M13, a source of the NMOS tube M13 is connected to a node between the drain of the NMOS tube M11 and the source of the PMOS tube M10, and a drain of the NMOS tube M13 serves as the reference voltage output terminal VREF to output the reference voltage.

In the starting circuit 10, the PMOS tube M1 is an inverted tube connected in series. When the power supply VDD1 is powered on, the reference voltage output terminal VREF is at low level, the voltage of the node A is close to VDD1, the NMOS tube M2 is switched on to pull down the gate potential of the PMOS tube M6, and the output voltage reference circuit 30 is activated. As the reference voltage gradually rises, the NMOS tube M3 is turned on, and the voltage of the node A is pulled down. At this time, the NMOS tube M2 is switched off, which will not affect the normal operation of the output voltage reference circuit 30.

The gate signal of the NMOS tube M8 is controlled by the reference voltage, and the reference voltage is a zero temperature coefficient voltage close to the threshold voltage, so a positive temperature coefficient transconductance can be realized.

The circuit composed of the NMOS tube M4, the NMOS tube M7, and the NMOS tube M8 generates a PTAT (proportional to absolute temperature) current, and the circuit composed of the PMOS tube M10, the NMOS tube M11, and the NMOS tube M13 forms a voltage with zero temperature coefficient. A zero temperature coefficient voltage is realized by adjusting the ratio of W/L of the PMOS tube M10, the NMOS tube M11, and the NMOS tube M13.

In the present disclosure, the difference of the gate-source voltage of the MOS tube operating in the sub-threshold region is adopted to generate a positive temperature coefficient current.

The starting circuit 10, the current generating circuit 20, and the output voltage reference circuit 30 in the voltage reference source circuit 100 all work in the sub-threshold region to reduce the device size and achieve the smallest layout area.

The voltage reference source circuit provides the temperature characteristics of the current, which is specifically derived as follows:

When the NMOS tube M4 and the NMOS tube M7 are working in the sub-threshold region, the drain current and voltage characteristics are as shown in the following expression:

$$I_D = I_0 \exp\left(\frac{V_{GS} - V_{TH}}{\eta V_T}\right)\left(1 - \exp\left(-\frac{V_{DS}}{V_T}\right)\right) \quad (1)$$

$V_G$s is the gate-source voltage, $V_{TH}$ is the threshold voltage, $V_T$ is the thermal voltage, and $\eta$ is a non-ideal factor.

$$I_0 = \mu\left(\frac{W}{L}\right)C_{OX}(\eta - 1)V_T^2 \quad (2)$$

W/L is the aspect ratio of the MOS device, and $C_{OX}$ is the gate oxide capacitance per unit area.

$$V_T = \frac{K_B T}{q} \quad (3)$$

When $V_{DS} > 3V_T$, the drain current expression (1) can be simplified as:

$$I_D = I_0 \exp\left(\frac{V_{GS} - V_{TH}}{\eta V_T}\right) \quad (4)$$

From (4), the gate-source voltage can be expressed as:

$$V_{GS} = \eta V_T \ln\frac{I_D}{I_0} + V_{TH} \quad (5)$$

The expression of MOS resistance of the MOS tube is:

$$R_{ON} = \frac{1}{K_{MR} * \mu_n C_{OX}(VREF - V_{TH})} \quad (6)$$

It can be concluded that the current of the NMOS tube M8 is:

$$I_{RON} = I_P = \frac{V_{GS1} - V_{GS2}}{R_{ON}} \quad (7)$$

Ignoring the offset effect of the NMOS tube M4 and the NMOS tube M7, and putting (5) and (6) into (7), the expression of current of the NMOS tube M8 is obtained as:

$$I_P = K_{MR} * \mu_n C_{OX}(VREF - V_{TH})\eta V_T \ln\frac{K_2}{K_1} \quad (8)$$

Among them, $K_{MR}$, $K_1$, and $K_2$ are the aspect ratios of the NMOS tube M8, the NMOS tube M4, and the NMOS tube M7, respectively.

The output reference voltage expression is:
$$VREF = V_{GS4} - V_{GS3} + V_{GS7} \quad (9)$$

Among them, $I_{D7} = I_P$, $I_{D4} = 3*I_P$. Substituting (9) realizes:

$$VREF = V_{TH4} + \eta V_T \ln\frac{3I_P}{K_4 * I_0} + \eta V_T \ln\frac{K_3}{K_7} \quad (10)$$

Under the conditions of $VREF - V_{TH0} \ll \kappa T$, $\eta VT \ll \kappa T$, (10) derivation of temperature results:

$$\frac{dV_{REF}}{dT} = -\kappa + \frac{\eta k_B}{q}\ln\left\{\frac{3q\eta\kappa}{k_B(\eta-1)}\frac{K_{MR}K_3}{K_4 K_7}\ln\left(\frac{K_2}{K_1}\right)\right\} \quad (11)$$

If $$\frac{dV_{REF}}{dT} = -\kappa + \frac{\eta k_B}{q}\ln\left\{\frac{3q\eta\kappa}{k_B(\eta-1)}\frac{K_{MR}K_3}{K_4 K_7}\ln\left(\frac{K_2}{K_1}\right)\right\} = 0,$$

gets $VREF = V_{TH0}$

The bias current at this time is:

$$I_P = K_{MR} * \mu_n C_{OX} \kappa T \eta V_T \ln\left(\frac{K_2}{K_1}\right) \quad (12)$$

Through (12), the current $I_P$ is a positive temperature coefficient current independent of the process angle.

Figure 5:
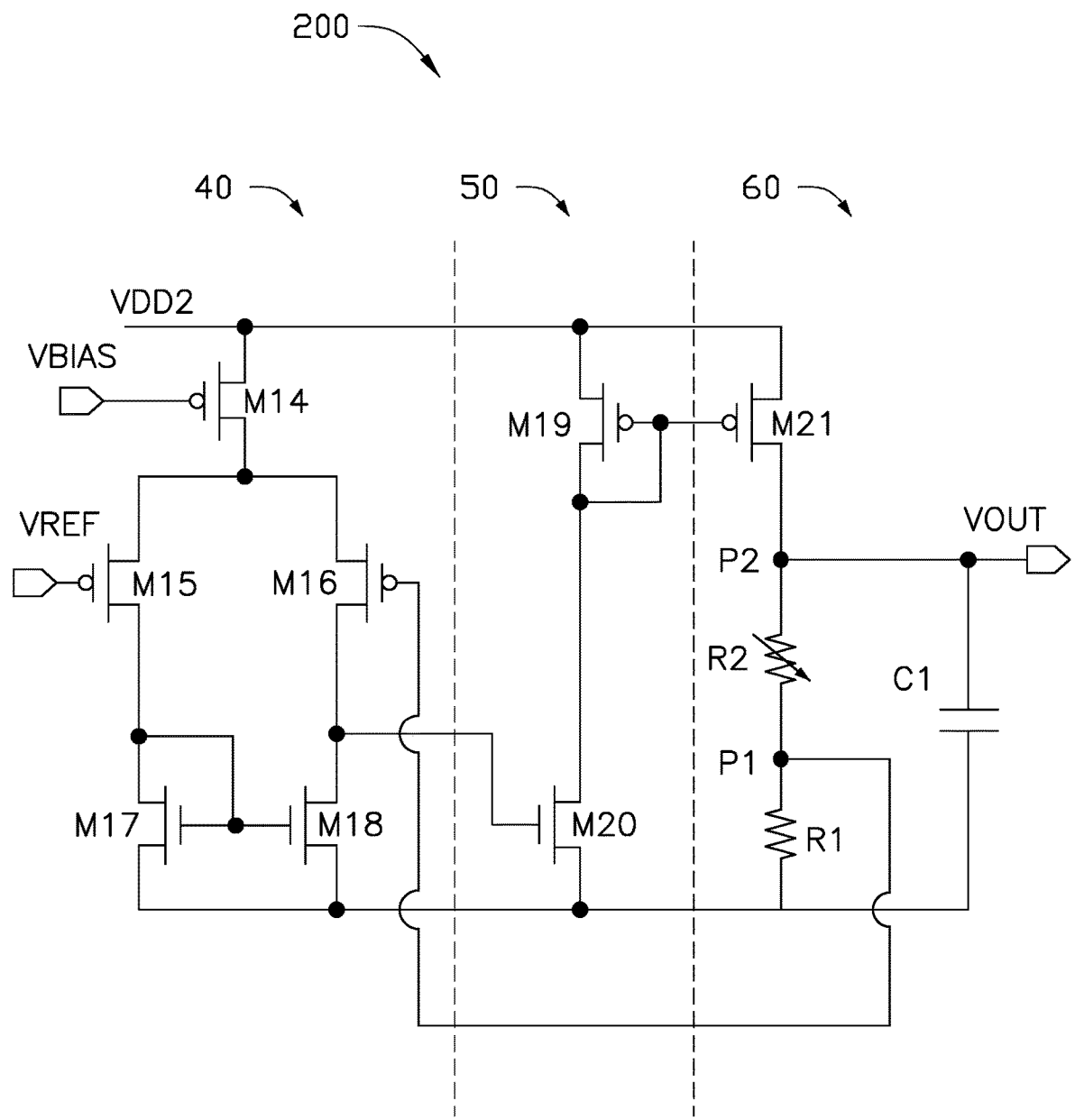
FIG. 5 is a circuit diagram of the first embodiment of a voltage regulator circuit used in circuit in FIG. 3.

Please refer to FIG. 5, FIG. 5 is a circuit diagram of the first embodiment of the voltage regulator circuit 200. In this embodiment, the voltage regulator circuit 200 includes a first branch 40, a second branch 50, and a third branch 60.

The first branch 40 includes a PMOS tube M14, a PMOS tube M15, a PMOS tube M16, an NMOS tube M17, and an NMOS tube M18. A gate of the PMOS tube M14 is connected to the drain of the PMOS tube M6, a source of the PMOS tube M14 is connected to the power supply VDD2, and a drain of the PMOS tube M14 is connected to a source of the PMOS tube M15 and a source of the PMOS tube M16. A gate of the PMOS tube M15 is connected to the reference voltage output terminal VREF to receive the reference voltage, a drain of the PMOS tube M15 is connected to a drain of the NMOS tube M17, a gate of the NMOS tube M17 is connected to a gate of the NMOS tube M18, the source of the NMOS tube M17 is grounded, a source of the NMOS tube M17 is also connected to a source of the NMOS tube M18, a drain of the PMOS tube M16 is connected to a drain of the NMOS tube M18, the drain of the PMOS tube M16 is also connected to the second branch 50, and a gate of the PMOS tube M16 is connected to the third branch 60.

The second branch 50 includes a PMOS tube M19 and an NMOS tube M20. A gate of the PMOS tube M19 is connected to a drain of the PMOS tube M19, a source of the PMOS tube M19 is connected to the power supply VDD2, the drain of the PMOS tube M19 is connected to a drain of the NMOS tube M20, a gate of the NMOS tube M20 is connected to the drain of the PMOS tube M16, and a source of the NMOS tube M20 is grounded.

The third branch 60 includes a PMOS tube M21, a resistor R1, an adjustable resistor R2, and a capacitor C1. A gate of the PMOS tube M21 is connected to the gate of the PMOS tube M19, a source of the PMOS tube M21 is connected to the power supply VDD2, and a drain of the PMOS tube M21 is connected to a first terminal of the adjustable resistor R2. A second terminal of the adjustable resistor R2 is grounded through the resistor. A node P1 between the second terminal of the adjustable resistor R2 and the resistor R1 is connected to the gate of the NMOS tube M17, and a node P2 between the drain of the PMOS tube M21 and the first terminal of the adjustable resistor R2 is used as the power supply output terminal VOUT. A first terminal of the capacitor C1 is connected to the supply voltage output terminal VOUT, and a second terminal of the capacitor C1 is grounded.

In this embodiment, the current of each branch is relatively small. In order to reduce the parasitic capacitance of each node, the size of the device is relatively small. The PMOS tube M14, the PMOS tube M15, the PMOS tube M16, the NMOS tube M17, the NMOS tube M18 and the NMOS tube M20 work in the sub-threshold region. The PMOS tube M19 improves the power supply rejection ratio (PSRR) of the voltage regulator circuit 200.

The second branch 50 is used to isolate the large parasitic capacitance of the PMOS tube M21 and the large output resistance of the first branch 40 to form a pole close to the origin. Among them, the capacitance value of the capacitor C1>100 nF makes the compensation easier.

Wherein, the supply voltage of the voltage regulator circuit 200 is denoted as VOUT and satisfies the following expression:

$$VOUT = \frac{R_1 + R_2}{R_1} VREF \quad (13)$$

$R_1$ is the resistance of the resistor R1, $R_2$ is the resistance of the adjustable resistor R2, and VREF is the reference voltage value. It can be seen from the above that the voltage regulator circuit 200 amplifies the reference voltage VREF by a preset ratio to obtain the supply voltage VOUT. The resistance value of the adjustable resistor R2 is adjustable, and the magnitude of the power supply voltage VOUT is proportional to the resistance value of the adjustable resistor R2.

Figure 6:
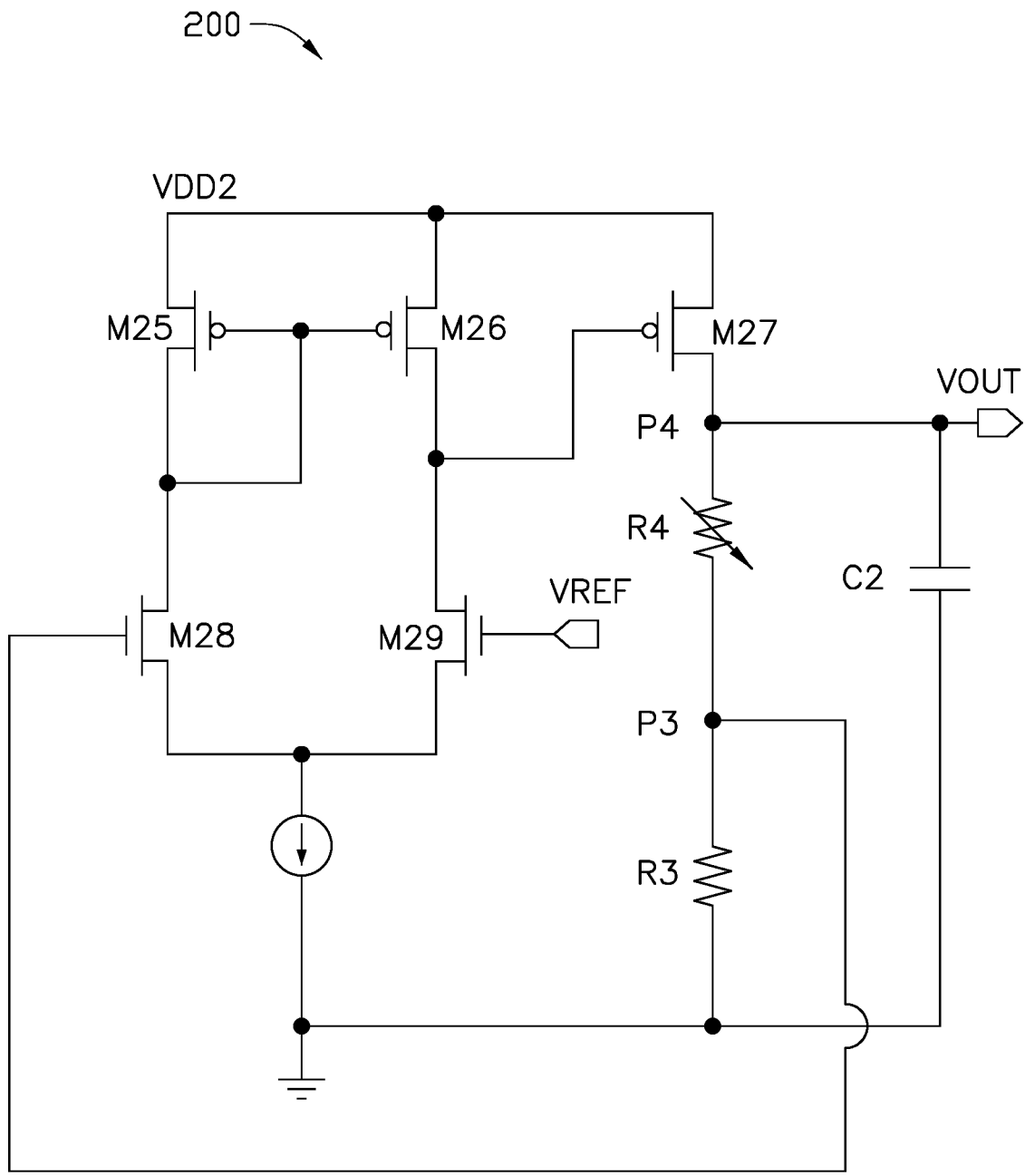
FIG. 6 is a circuit diagram of a second embodiment of a voltage regulator circuit.

Please continue to refer to FIG. 6, FIG. 6 is a circuit diagram of a second embodiment, voltage regulator circuit 200.

In this embodiment, the voltage regulator circuit 200 includes a PMOS tube M25, a PMOS tube M26, a PMOS tube M27, an NMOS tube M28, an NMOS tube M29, a resistor R3, an adjustable resistor R4, and a capacitor C2.

A source of the PMOS tube M25 is connected to the power supply VDD4, A gate of the PMOS tube M25 is connected to a drain of the PMOS tube M25, and a gate of the PMOS tube M25 is also connected to a gate of the PMOS tube M26. A source is connected to the power supply VDD2, a drain of the PMOS tube M26 is connected to a gate of the PMOS tube M27, a source of the PMOS tube M27 is connected to the power supply VDD2, and a drain of the PMOS tube M27 is grounded through the adjustable resistor R4 and the resistor R3 in turn. Drain of the PMOS tube M26 is connected to a drain of the NMOS tube M29, a gate of the NMOS tube M29 is connected to the reference voltage output terminal VREF, a source of the NMOS tube M29 and a source of the NMOS tube M28 are grounded through a current source, a drain of the NMOS tube M28 is connected to the drain of the PMOS tube M25, and a gate of the NMOS tube M28 is connected to a node P3 between the adjustable resistor R4 and the resistor R3. Node P4 between the drain of the PMOS tube M27 and the adjustable resistor R4 serves as the power supply output terminal VOUT. A first terminal of the capacitor C4 is connected to the supply voltage output terminal VOUT, and a second terminal of the capacitor C4 is grounded.

The low power consumption power supply system 300 generates a reference voltage with zero temperature coefficient through the voltage reference source circuit 100, and the voltage regulator circuit 200 amplifies the reference voltage by a preset ratio and outputs the power supply. In this way, the low power consumption power supply system provided by the present disclosure has a simple circuit structure, strong anti-noise ability, high stability, and high performance.

Those of ordinary skill in the art should realize that the above embodiments are only used to illustrate the present disclosure, but not to limit the present disclosure. As long as they are within the essential spirit of the present disclosure, the above embodiments and others are appropriate. Changes fall within the scope of protection of the present disclosure.

What is claimed is:
1. A voltage reference source circuit, configured to generate a reference voltage comprising a starting circuit, a current generating circuit and an output voltage reference circuit electrically connected in sequence, wherein
the starting circuit provides a starting voltage for the voltage reference source circuit to prevent the voltage reference source circuit from operating in a zero state area;
the current generating circuit generates a working current for the output voltage reference circuit; and the output voltage reference circuit realizes the reference voltage output with zero temperature coefficient according to the working current output by the current generating circuit;

wherein the starting circuit comprises a first PMOS tube, a first NMOS tube, and a second NMOS tube, a source of the first PMOS tube is connected to a first power source, and a gate of the first PMOS tube is grounded, a drain of the first PMOS tube is connected to the gate of the first NMOS tube, and a drain and a source of the first NMOS tube lead out a first start signal output terminal and a second start signal output terminal respectively, to provide a start signal to the current generating circuit, and a drain of the second NMOS tube is connected to the gate of the first NMOS tube, a source of the second NMOS tube is grounded, and the source of the second NMOS tube is also connected to the source of the first NMOS tube, and a gate of the second NMOS tube is connected to a reference voltage output terminal, the first PMOS tube is an inverted tube, when the first power source is powered on, the reference voltage output terminal is at low level, the first NMOS tube is turned on to activate the output voltage reference circuit, when the reference voltage of the reference voltage output terminal rises, the second NMOS tube is turned on, the first NMOS tube is turned off.

2. The voltage reference source circuit according to claim 1, wherein the current generating circuit comprises a third NMOS tube, a second PMOS tube, a third PMOS tube, a fourth NMOS tube, and a fifth NMOS tube;

wherein a source of the third NMOS tube is connected to the source of the second NMOS tube, a gate of the third NMOS tube is connected to a drain of the third NMOS tube, and the drain of the third NMOS tube is also connected to a drain of the second PMOS tube, wherein a source of the second PMOS tube is connected to the first power source, a gate of the second PMOS tube is connected to the drain of the first NMOS tube, and a gate of the second PMOS tube is also connected to a gate of the third PMOS tube, a source of the third PMOS tube is connected to the first power source, a drain of the third PMOS tube is connected to a drain of the fourth NMOS tube, and wherein a gate of the fourth NMOS tube is connected to the gate of the third NMOS tube, a source of the fourth NMOS tube is connected to a drain of the fifth NMOS tube, a source of the fifth NMOS tube is grounded, and a gate of the fifth NMOS tube is connected to the reference voltage output terminal.

3. The voltage reference source circuit according to claim 2, wherein the output voltage reference circuit comprises a fourth PMOS tube, a fifth PMOS tube, a sixth NMOS tube, a seventh NMOS tube, and an eighth NMOS tube, wherein a source of the fourth PMOS tube is connected to the first power source, a gate of the fourth PMOS tube is connected to the drain of the third PMOS tube, a drain of the fourth PMOS tube is connected to a drain of the fifth PMOS tube, and a gate of the fifth PMOS tube is connected to a drain of the fifth PMOS tube, a gate of the fifth PMOS tube is also connected to a gate of the sixth NMOS tube, and wherein a source of the fifth PMOS tube is connected to a drain of the sixth NMOS tube, a source of the sixth NMOS tube is connected to a source of the fifth NMOS tube, a gate of the seventh NMOS tube is connected to a gate of the fourth PMOS tube, and a source of the seventh NMOS tube is connected to the first power supply, a drain of the seventh NMOS tube is connected to a drain and a gate of the eighth NMOS tube, a source of the eighth NMOS tube is connected to the drain of the sixth NMOS tube, and a drain of the eighth NMOS tube serves as the reference voltage output terminal.

4. A low power consumption power supply system comprising a voltage regulator circuit and a voltage reference source circuit, the voltage reference source circuit configured to generate a reference voltage, the voltage reference source circuit comprising a starting circuit, a current generating circuit and an output voltage reference circuit electrically connected in sequence, wherein the starting circuit provides a starting voltage for the voltage reference source circuit to prevent the voltage reference source circuit from operating in a zero state area;

the current generating circuit generates a working current for the output voltage reference circuit and the output voltage reference circuit realizes the reference voltage output with zero temperature coefficient according to the working current output by the current generating circuit;

wherein the starting circuit comprises a first PMOS tube, a first NMOS tube, and a second NMOS tube, a source of the first PMOS tube is connected to a first power source, and a gate of the first PMOS tube is grounded, a drain of the first PMOS tube is connected to the gate of the first NMOS tube, and a drain and a source of the first NMOS tube lead out a first start signal output terminal and a second start signal output terminal respectively, to provide a start signal to the current generating circuit, and a drain of the second NMOS tube is connected to the gate of the first NMOS tube, a source of the second NMOS tube is grounded, and the source of the second NMOS tube is also connected to the source of the first NMOS tube, and a gate of the second NMOS tube is connected to a reference voltage output terminal, the first PMOS tube is an inverted tube, when the first power source is powered on, the reference voltage output terminal is at low level, the first NMOS tube is turned on to activate the output voltage reference circuit, when the reference voltage of the reference voltage output terminal rises, the second NMOS tube is turned on, the first NMOS tube is turned off;

wherein the voltage regulator circuit is electrically connected to the voltage reference source circuit, the voltage regulator circuit receives a reference voltage, and amplifies the reference voltage in a preset ratio and output a power supply.

5. The low power consumption power supply system according to claim 4, wherein the current generating circuit comprises a third NMOS tube, a second PMOS tube, a third PMOS tube, a fourth NMOS tube, and a fifth NMOS tube;

wherein a source of the third NMOS tube is connected to the source of the second NMOS tube, a gate of the third NMOS tube is connected to a drain of the third NMOS tube, and the drain of the third NMOS tube is also connected to a drain of the second PMOS tube, wherein a source of the second PMOS tube is connected to the first power source, a gate of the second PMOS tube is connected to the drain of the first NMOS tube, and a gate of the second PMOS tube is also connected to a gate of the third PMOS tube, a source of the third PMOS tube is connected to the first power source, a drain of the third PMOS tube is connected to a drain of the fourth NMOS tube, and wherein a gate of the fourth NMOS tube is connected to the gate of the third NMOS tube, a source of the fourth NMOS tube is connected to a drain of the fifth NMOS tube, a source of the fifth NMOS tube is grounded, and a gate of the fifth NMOS tube is connected to the reference voltage output terminal.

6. The low power consumption power supply system according to claim 5, wherein the output voltage reference circuit comprises a fourth PMOS tube, a fifth PMOS tube, a sixth NMOS tube, a seventh NMOS tube, and an eighth NMOS tube, wherein a source of the fourth PMOS tube is connected to the first power source, a gate of the fourth PMOS tube is connected to the drain of the third PMOS tube, a drain of the fourth PMOS tube is connected to a drain of the fifth PMOS tube, and a gate of the fifth PMOS tube is connected to a drain of the fifth PMOS tube, a gate of the fifth PMOS tube is also connected to a gate of the sixth NMOS tube, and wherein a source of the fifth PMOS tube is connected to a drain of the sixth NMOS tube, a source of the sixth NMOS tube is connected to a source of the fifth NMOS tube, a gate of the seventh NMOS tube is connected to a gate of the fourth PMOS tube, and a source of the seventh NMOS tube is connected to the first power supply, a drain of the seventh NMOS tube is connected to a drain and a gate of the eighth NMOS tube, a source of the eighth NMOS tube is connected to the drain of the sixth NMOS tube, and a drain of the eighth NMOS tube serves as the reference voltage output terminal.

7. The low power consumption power supply system according to claim 4, wherein the voltage regulator circuit comprises a first branch, a second branch, and a third branch electrically connected in sequence, wherein the first branch comprises a sixth PMOS tube, a seventh PMOS tube, an eighth PMOS tube, a ninth NMOS tube and a tenth NMOS tube, wherein a gate of the sixth PMOS tube is connected to the drain of the third PMOS tube, and a source of the sixth PMOS tube is connected to a second power source, a drain of the sixth PMOS tube is connected to a source of the seventh PMOS tube and a source of the eighth PMOS tube, a gate of the seventh PMOS tube is connected to the reference voltage output terminal to receive the reference voltage, a drain of the seventh PMOS tube is connected to a drain of the ninth NMOS tube, and wherein a gate of the ninth NMOS tube is connected to a gate of the tenth NMOS tube, a source of the ninth NMOS tube is grounded, and a ninth NMOS tube is grounded, a source of the tube is also connected to a source of the tenth NMOS, a drain of the eighth PMOS tube is connected to a drain of the tenth NMOS tube, and the drain of the eighth PMOS tube is also connected to the second branch, a gate of the eight PMOS tube is connected to the third branch.

8. The low power consumption power supply system according to claim 4, wherein the second branch comprises a ninth PMOS tube and an eleventh NMOS tube, and a gate of the ninth PMOS tube is connected to a drain of the ninth PMOS tube, wherein a source of the ninth PMOS tube is connected to the second power source, a drain of the ninth PMOS tube is connected to a drain of the eleventh NMOS tube, and a gate of the eleventh NMOS tube is connected to the drain of the eighth PMOS tube, a drain of the eleventh NMOS tube is grounded.

9. The low power consumption power supply system according to claim 5, wherein the third branch comprises a tenth PMOS tube, an adjustable resistor, a resistor, and a capacitor, and a gate of the tenth PMOS tube is connected to the drain of the ninth PMOS tube, wherein a source of the tenth PMOS tuber is connected to the second power source, a drain of the tenth PMOS tube is connected to a first terminal of the adjustable resistor, and a second terminal of the adjustable resistor is grounded through the resistor, a first node between the second terminal of the adjustable resistor and the resistor is connected to the gate of the ninth NMOS tube, and a second node between the drain of the tenth PMOS tube and the first terminal of the adjustable resistor is used as the power supply voltage output terminal.

10. The low power consumption power supply system according to claim 6, wherein the third branch further comprises a capacitor, a first terminal of the capacitor is connected to the power supply voltage output terminal, and a second terminal of the capacitor is grounded.

11. The low power consumption power supply system according to claim 4, wherein the voltage regulator circuit comprises a sixth PMOS tube, a seventh PMOS tube, an eighth PMOS tube, a ninth NMOS tube, a tenth NMOS tube, a resistor, and adjustable resistor, wherein a source of the sixth PMOS tube is connected to the second power source, a gate of the sixth PMOS tube is connected to a drain of the sixth PMOS tube, and a gate of the sixth PMOS tube is also connected to a seventh PMOS tube, a source of the seventh PMOS tube is connected to the second power source, a drain of the seventh PMOS tube is connected to a gate of the eighth PMOS tube, and a source of the eighth PMOS tube is connected to the second power source, a drain of the eighth PMOS tube is grounded through the adjustable resistor and the resistor in turn, a drain of the seventh PMOS tube is connected to a drain of the tenth NMOS tube, and wherein a gate of the tenth NMOS tube is connected to the reference voltage output terminal, a source of the tenth NMOS tube and the source of the ninth NMOS tube are grounded through a current source, the drain of the ninth NMOS tube is connected to the drain of the sixth PMOS tube, and the gate of the ninth NMOS tube is connected to the node between the adjustable resistor and the resistor, and the node between the drain of the eighth PMOS tube and the adjustable resistor is used as the power supply output terminal.

\* \* \* \* \*